US009051427B2

(12) United States Patent
Hasegawa et al.

(10) Patent No.: US 9,051,427 B2
(45) Date of Patent: Jun. 9, 2015

(54) RARE-EARTH COMPLEX POLYMER AND PLASTIC MOLDED PRODUCT

(75) Inventors: Yasuchika Hasegawa, Sapporo (JP); Kohei Miyata, Sapporo (JP); Koji Fushimi, Sapporo (JP); Masako Kato, Sapporo (JP); Atsushi Kobayashi, Sapporo (JP)

(73) Assignee: NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 14/115,227

(22) PCT Filed: May 1, 2012

(86) PCT No.: PCT/JP2012/061562
§ 371 (c)(1), (2), (4) Date: Mar. 4, 2014

(87) PCT Pub. No.: WO2012/150712
PCT Pub. Date: Nov. 8, 2012

(65) Prior Publication Data
US 2014/0171600 A1     Jun. 19, 2014

(30) Foreign Application Priority Data

May 2, 2011   (JP) ................................. 2011-103136

(51) Int. Cl.
*C08G 79/04*   (2006.01)
*C08L 85/02*   (2006.01)
(Continued)

(52) U.S. Cl.
CPC ............... *C08G 79/04* (2013.01); *C08G 79/14* (2013.01); *C09K 11/06* (2013.01); *C08K 5/5397* (2013.01); *C08L 85/02* (2013.01); *C08L 101/00* (2013.01); *C09K 2211/14* (2013.01); *C09K 2211/185* (2013.01); *C08K 5/0091* (2013.01)

(58) Field of Classification Search
CPC .................. C09K 2211/182; C09K 2211/1408
USPC ......................................................... 525/538
See application file for complete search history.

(56) References Cited

U.S. PATENT DOCUMENTS

| 6,292,292 B1 | 9/2001 | Garito et al. |
| 7,947,340 B2 * | 5/2011 | Ikehira et al. ................. 428/1.1 |

(Continued)

FOREIGN PATENT DOCUMENTS

| JP | 2003-523457 A | 8/2003 |
| JP | 2010-095514 A | 4/2010 |

(Continued)

OTHER PUBLICATIONS

International Search Report with a mailing date of Aug. 14, 2012 for counterpart International Application No. PCT/JP2012/061562.

(Continued)

*Primary Examiner* — Mike M Dollinger
(74) *Attorney, Agent, or Firm* — Sughrue Mion, PLLC

(57) ABSTRACT

The present invention intends to provide a rare-earth complex polymer having a sufficient heat resistance to be blended in a plastic material and fabricated. A preferable embodiment of the rare-earth complex polymer comprises a plurality of both trivalent rare-earth ions and phosphine oxide multidentate ligands and a crosslinked structure formed by the phosphine oxide multidentate ligands being coordinated to a plurality of the rare-earth ions.

4 Claims, 4 Drawing Sheets

(51) Int. Cl.
   *C08G 79/14* (2006.01)
   *C09K 11/06* (2006.01)
   *C08L 101/00* (2006.01)
   *C08K 5/5397* (2006.01)
   *C08K 5/00* (2006.01)

(56) References Cited

U.S. PATENT DOCUMENTS

| | | | |
|---|---|---|---|
| 8,545,807 B2* | 10/2013 | Hasegawa et al. | 424/1.11 |
| 2007/0231250 A1* | 10/2007 | Im et al. | 423/592.1 |
| 2007/0290605 A1 | 12/2007 | Goto et al. | |
| 2009/0005243 A1* | 1/2009 | Goddard et al. | 502/401 |
| 2011/0187969 A1* | 8/2011 | Ikehira et al. | 349/69 |

FOREIGN PATENT DOCUMENTS

| | | |
|---|---|---|
| JP | 2010-278376 A | 12/2010 |
| JP | 2011-157279 A | 8/2011 |
| WO | 2005/044770 A1 | 5/2005 |
| WO | 2005/104628 A1 | 11/2005 |
| WO | 2008/111293 A1 | 9/2008 |
| WO | 2011/013520 A1 | 2/2011 |

OTHER PUBLICATIONS

English translation of the International Preliminary Report on Patentability and Written Opinion of the International Searching Authority with a mailing date of Nov. 14, 2013 for counterpart International Application No. PCT/JP2012/061562.

Han-Yu Feng, et al.; "Fluorescence Properties of Ternary Complexes of Polymer-Bond Triphenylphosphine, Triphenylarsine, Triphenylstibine, and Triphenylbismuthine, Rare Earth Metal Ions, and Thenoyltrifluoroacetone"; Journal of Applied Polymer Science; vol. 68; 1998; pp. 1605-1611.

Yasuchika Hasegawa, et al.; "Luminescent Polymer Containing the Eu(III) Complex Having Fast Radiation Rate and High Emission Quantum Efficiency"; J. Phys. Chem., A; 2003; 107; pp. 1697-1702.

Hui Xu, et al.; "Photophysical and electroluminescent properties of a Series of Monochromatic red-emitting europium-complexed nonconjugated copolymers based on diphenylphosphine oxide modified polyvinylcarbazole"; Polymer; vol. 52; 2011; pp. 804-813.

Kohei Miyata, et al.; "Thermostable Organo-phosphor: Low-Vibrational Coordination Polymers That Exhibit Different Intermolecular Interactions"; A Genuinely Multidisciplinary Journal, Chempluschem; 77; 2012; pp. 277-280.

* cited by examiner

RARE-EARTH COMPLEX POLYMER AND PLASTIC MOLDED PRODUCT

CROSS REFERENCE TO RELATED APPLICATIONS

This application is a National Stage of International Application No. PCT/JP2012/061562 filed May 1, 2012, claiming priority based on Japanese Patent Application No. 2011-103136 filed May 2, 2011, the contents of all of which are incorporated herein by reference in their entirety.

TECHNICAL FIELD

The present invention relates to a rare-earth complex polymer and a plastic molded product.

BACKGROUND ART

Blending a fluorescent material to a plastic material to impart identification information has been studied. For example, a fluorescent material is blended in a plastic material used in a food tray, and by detecting fluorescence emitted from the tray, information can be read in the same way as a barcode or the like. Therefore, information on the production area of foods or the like can be imparted to the tray by blending a fluorescent material in a plastic material. In this case, it is necessary to irradiate the light of a specific wavelength in order to detect the fluorescence from the plastic material in which the fluorescent material is blended, but fluorescence spectra to be obtained varies depending on the kinds of fluorescent materials to be used, and therefore it is possible to impart information in cipher. The technology for imparting encrypted information with a fluorescent material by utilizing such a property has been receiving a lot of attention.

Plastic materials are in general fabricated by being melted at a high temperature (for example, about 300° C. for polycarbonate products), therefore a fluorescent material is required to be capable of emitting fluorescence with a sufficient intensity without decomposition even after the heating at a high temperature in the fabrication process. In the case where an inorganic fluorescent material such as $Y_2O_3$:Eu used in Braun tube for color TVs is used, there is no problem with heat resistance, but one problem thereof is that the inorganic fluorescent materials cannot be uniformly dispersed in plastic materials because the inorganic fluorescent materials are not dissolved in plastic materials. Moreover, another problem of inorganic fluorescent materials is that while the fluorescent emission can be observed in organic solvents, the fluorescence is not emitted when the inorganic fluorescent materials are blended in plastic materials.

On the other hand, it is known that organic rare-earth complexes in which an organic ligand is coordinated to a rare-earth ion can be uniformly dispersed in plastic materials and can emit fluorescence even when dispersed in plastic materials. However, up to now, it has tended to be difficult to blend organic rare-earth complexes in plastic materials because ligands constituting the complexes decompose when the complexes are heated to a temperature needed to fabricate plastic materials.

In such circumstances, it is shown in Patent Literature 1 listed below that a multinuclear rare-earth complex in which one or more types of molecules having a photosensitizing function are coordinated to a rare-earth ion has a high heat resistance and therefore can be blended in plastic materials and fabricated.

CITATION LIST

Patent Literature

[Patent Literature 1] International Publication No. WO 2005/044770 Pamphlet

SUMMARY OF INVENTION

Technical Problem

In the case where an organic rare-earth complex is used as a fluorescent material to be blended in a plastic material, as described above, it is required to have a high heat resistance. Besides, it is sometimes required for an organic rare-earth complex to have a higher emission intensity or a higher optical durability depending on its use application. Since properties of an organic rare-earth complex significantly vary depending on the structure of a rare-earth ion or, a ligand, organic rare-earth complexes of a huge variety of structures have been required to meet various required properties as an organic rare-earth complex having an excellent heat resistance in recent years.

Accordingly, the present invention has made in consideration of these circumstances and intends to provide a rare-earth complex polymer having a sufficient heat resistance to be blended in a plastic material and fabricated.

Solution to Problem

In order to achieve the above object, a rare-earth complex polymer of the present invention comprises a plurality of both trivalent rare-earth ions and phosphine oxide multidentate ligands and a crosslinked structure formed by the phosphine oxide multidentate ligands being coordinated to a plurality of the rare-earth ions.

The rare-earth complex polymer of the present invention comprising the above constitution has a structure in which a phosphine oxide multidentate ligand as an organic ligand is coordinated to a rare-earth ion, and therefore a uniform dispersion in a plastic material is possible. Moreover, the rare-earth complex polymer comprises a structure in which rare-earth ions are crosslinked by the phosphine oxide multidentate ligand, and therefore has a stable molecular structure. Thus, the rare-earth complex polymer resists decomposition even when blended in a plastic material and fabricated at a high temperature and can exhibit an excellent heat resistance. Furthermore, in the rare-earth complex polymer of the present invention, a ligand coordinated to rare-earth ions is the phosphine oxide multidentate ligand, and therefore it is possible to decrease a hydrogen atom to become a cause of deterioration of emission intensity or optical durability.

Accordingly, the rare-earth complex polymer of the present invention has an excellent heat resistance, and therefore it is possible to be blended in a plastic material as a fluorescent material and fabricated, and besides, it is possible to exhibit a high emission intensity and a high optical durability.

When the phosphine oxide multidentate ligand in the rare-earth complex polymer of the present invention is a phosphine oxide bidentate ligand comprising a structure represented by the following formula (1), the above described effect tends to be obtained further favorably.

[Chemical Formula 1]

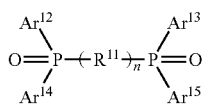

(1)

[In the formula (1), $R^{11}$ is a divalent organic group, $Ar^{12}$, $Ar^{13}$, $Ar^{14}$, and $Ar^{15}$ each independently represent a monovalent aromatic group which may have a substituent, and $Ar^{12}$ and $Ar^{13}$, and $Ar^{14}$ and $Ar^{15}$ may be directly bonded with each other or may be bonded through a predetermined group. n is an integer of 1 to 20.]

Moreover, from a viewpoint of obtaining the above effect more favorably, it is preferable that a ligand represented by the following formula (2) is further coordinated to the rare-earth ion in the rare-earth complex polymer. Furthermore, it is preferable that, in the rare-earth complex polymer, one rare-earth ion forms a coordination structure having a coordination number of 8 or more by a plurality of the phosphine oxide multidentate ligands each being coordinated to the rare-earth ion at one site and a plurality of ligands represented by the following formula (2), the ligands each being coordinated to the rare-earth ion at two sites.

[Chemical Formula 2]

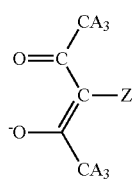

(2)

[In the formula (2), A represents a hydrogen atom or a halogen atom, Z represents a hydrogen atom or a deuterium atom.]

It is preferable that, in the phosphine bidentate ligand represented by the above formula (1), $R^{11}$ is a group represented by the following formula (3a), a group represented by the following formula (3b), a group represented by the following formula (3c), or a group represented by the following formula (3d). With the rare-earth complex polymer comprising a phosphine oxide bidentate ligand having the above structure, the above described effect can be obtained even further favorably.

[Chemical Formula 3]

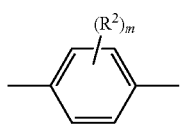

(3a)

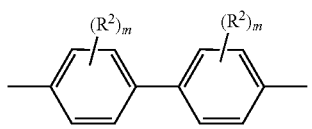

(3b)

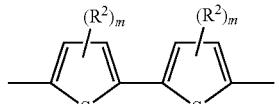

(3c)

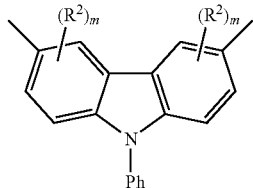

(3d)

[In the formulas, $R^2$ is a monovalent organic group, m is an integer of 0 to a number of sites capable of being substituted in a ring which $R^2$ is bonded with, Ph represents a phenyl group. In the case where m is 2 or more, a plurality of $R^2$ may be each the same or different from each other.]

The present invention also provides a plastic molded product comprising a plastic material and the above rare-earth complex polymer of the present invention dispersed in the plastic material. The plastic molded product of the present invention comprises the above rare-earth complex polymer of the present invention, and therefore, processing is possible even when a plastic material for which a high temperature is needed is applied, and furthermore, the plastic molded product of the present invention can maintain a high emission intensity after the processing.

Advantageous Effects of Invention

According to the present invention, it becomes possible to provide a rare-earth complex polymer having a sufficient heat resistance to be blended in a plastic material and fabricated and, furthermore, being able to exhibit a high emission intensity and a high optical durability.

DESCRIPTION OF EMBODIMENTS

Figure 1:
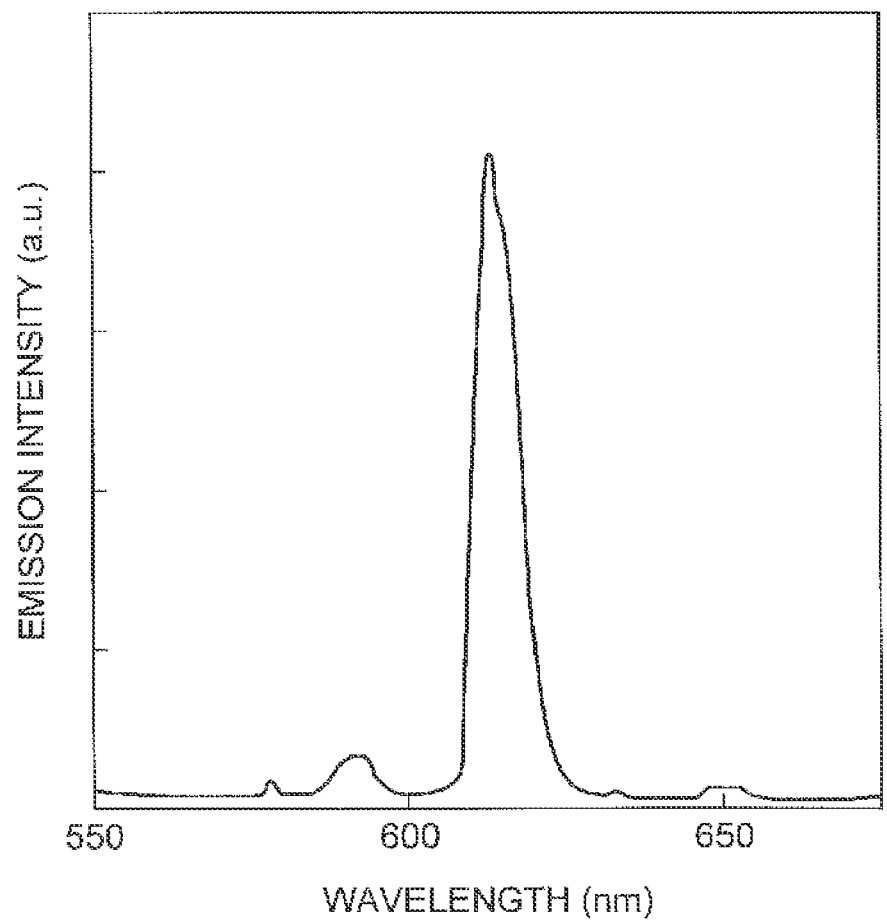
FIG. 1 is a chart showing an emission spectrum of a solid state of a rare-earth complex polymer, $[Eu(hfa)_3(dpb)]_n$, of Example 1 excited at 380 nm (ligand excitation).

Hereinafter, a preferable embodiment of the present invention will be described.

A rare-earth complex polymer of a preferable embodiment of the present invention comprises a plurality of both trivalent rare-earth ions and phosphine oxide multidentate ligands and a crosslinked structure formed by the phosphine oxide multidentate ligands being coordinated to a plurality of the rare-earth ions. In the rare-earth complex polymer, a plurality of sites capable of being coordinated that the phosphine oxide multidentate ligand has are each coordinated to a different rare-earth ion, thereby a polymer-like structure in which a plurality of rare-earth ions are sequentially arranged through a crosslinked structure comprising the phosphine oxide multidentate ligand is formed. As described above, a complex polymer used herein means a compound comprising a structure formed by a plurality of metal ions being linked through a coordinate bond by a ligand.

Examples of the trivalent rare-earth ion include a Eu(III) ion, a Tb(III) ion, a Sm(III) ion, an Yb(III) ion, a Nd(III) ion, an Er(III) ion. Among these, from a viewpoint of obtaining a high emission intensity and a high heat resistance, a Eu(III) ion or a Tb(III) ion is preferable, and a Eu(III) ion is more preferable.

Examples of the phosphine oxide multidentate ligand include a phosphine oxide bidentate ligand comprising a structure represented by the following formula (1).

[Chemical Formula 4]

(1)

In the formula (1), $R^{11}$ represents a divalent organic group. The divalent organic group is not particularly limited and may be a group in which a plurality of groups are linked. Examples of $R^{11}$ include divalent unsaturated groups, divalent aromatic groups, and oxyalkylene groups, and another group may further be bonded with these groups. Moreover, $R^{11}$ may be a group constituted by a plurality of these divalent groups being bonded and furthermore may be a group having a polymer-like structure.

Here, examples of the divalent unsaturated groups include alkenylene groups such as a vinylene group. The aromatic group means a group comprising an aromatic ring having two bonds with phosphorus atoms, and the aromatic ring may further have a substituent at a site different from the bonding site with the phosphorus atom. Examples of the aromatic ring include a benzene ring, a thiophene ring, and a pyridine ring. Examples of the oxyalkylene group include an oxymethylene group. Moreover, examples of the group in which a plurality of these divalent groups are bonded include groups in which two or more aromatic rings are bonded, and groups comprising a polyethylenedioxythiophene (PEDOT) bonded with a phosphorus atom at both terminals.

Among these, it is preferable that $R^{11}$ is a group comprising at least one aromatic ring, more preferably a group comprising a plurality of aromatic rings. The heat resistance of the rare-earth complex polymer tends to be further enhanced by $R^{11}$ comprising an aromatic ring, in particular a plurality of aromatic rings. It is preferable from the viewpoint of obtaining a more excellent heat resistance that $R^{11}$ is a group represented by the following formula (3a), (3b), (3c), or (3d), more preferably a group represented by the following formula (3b) or (3c), even more preferably a group represented by the following formula (3c).

[Chemical Formula 5]

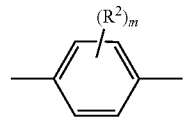

(3a)

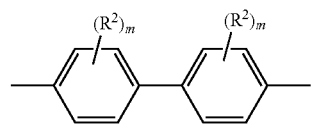

(3b)

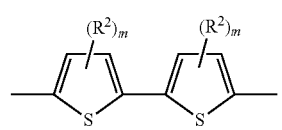

(3c)

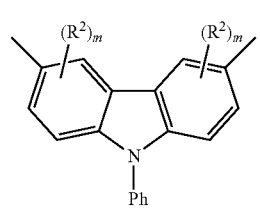

(3d)

In the formulas (3a), (3b), (3c), and (3d), $R^2$ is a monovalent organic group, m is an integer of 0 to a number of sites capable of being substituted in an aromatic ring (a benzene ring or a thiophene ring) which $R^2$ is bonded with, and Ph represents a phenyl group. In the case where m is 2 or more, a plurality of $R^2$ may be each the same or different from each other. Examples of the monovalent organic group as $R^2$ include a $C_1$ to $C_{20}$ hydrocarbon group, a hydroxyl group, a nitro group, an amino group, a sulfonyl group, a cyano group, a silyl group, a phosphonate group, a diazo group, and a mercapto group.

Moreover, in the formula (1), $Ar^{12}$, $Ar^{13}$, $Ar^{14}$, and $Ar^{15}$ each independently represent a monovalent aromatic group which may have a substituent. The monovalent aromatic group is a group comprising an aromatic ring having one bond with a phosphorus atom, and the aromatic ring may further have a substituent at a bonding site different from the bonding site with the phosphorus atom. Examples of the aromatic ring include an aromatic ring same as the aromatic ring from which a divalent aromatic group can be formed in $R^{11}$. Moreover, examples of the substituent include a group same as the monovalent organic group as $R^2$, a phosphine oxide group (a group represented by —P(=)$R^{31}R^{32}$, examples of $R^{31}$ and $R^{32}$ include a group same as $Ar^{12}$, $Ar^{13}$, $Ar^{14}$, and $Ar^{15}$). In the case where an aromatic ring that constitutes $Ar^{12}$, $Ar^{13}$, $Ar^{14}$, and $Ar^{15}$ comprises a phosphine oxide group as a substituent, the aromatic ring may be coordinated to a rare-earth ion at this substituent part. Moreover, $Ar^{12}$ and $Ar^{13}$, and $Ar^{14}$ and $Ar^{15}$ may be directly bonded with each other, or may be bonded through a linking group comprising a divalent organic group such as an alkylene group, an arylene group and a carbonyl group.

Examples of $Ar^{12}$, $Ar^{13}$, $Ar^{14}$ and $Ar^{15}$ each independently include a group represented by the following formula (6).

[Chemical Formula 6]

(6)
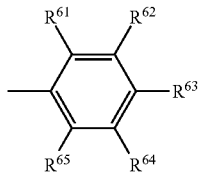

[In the formula (6), $R^{61}$, $R^{62}$, $R^{63}$, $R^{64}$, and $R^{65}$ each independently represent a hydrogen atom, a $C_1$ to $C_{20}$ hydrocarbon group, a hydroxyl group, a nitro group, an amino group, a sulfonyl group, a cyano group, a silyl group, a phosphonate group, a diazo group, or a mercapto group.]

It is preferable from the viewpoint of taking a stable complex structure, a plurality of the phosphine oxide multidentate ligands or other ligands are coordinated to the rare-earth ion constituting the rare-earth complex polymer. It is preferable from the viewpoint of favorably obtaining properties such as emission intensity as well as a high heat resistance that the phosphine oxide multidentate ligands are coordinated to one rare-earth ion at two or more sites and another ligand is further coordinated to the other sites.

As another ligand, a multidentate ligand is preferable because the heat resistance of the rare-earth complex polymer is enhanced. Above all, a ligand comprising acetylacetonate or a derivative thereof is preferable. Examples of such a ligand include a ligand represented by the following formula (2). Above all, a ligand comprising hexafluoroacetylacetonate is more preferable as another ligand.

[Chemical Formula 7]

(2)
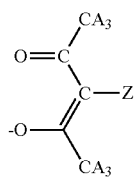

[In the formula, A represents a hydrogen atom or a halogen atom, and Z represents a hydrogen atom or a deuterium atom.]

In order to preferably obtain the heat resistance, the emission intensity, and the optical durability, it is preferable that, in the rare-earth complex polymer, one rare-earth ion forms a coordination structure having a coordination number of 8 or more by two or more phosphine oxide bidentate ligands each being coordinated to the rare-earth ion at one site and two or more ligands represented by the above formula (2), the ligands each being coordinated to the rare-earth ion at two sites.

An example of a preferable rare-earth complex polymer includes a rare-earth complex polymer having a structure represented by the following formula (4). In the rare-earth complex polymer of the present example, the rare-earth ion is a Eu(III) ion, the phosphine oxide multidentate ligand has a divalent aromatic group represented by $Ar^1$ as a divalent group represented by the above $R^{11}$ and a phenyl group as $Ar^{12}$, $Ar^{13}$, $Ar^{14}$, and $Ar^{15}$, and hexafluoroacetylacetonate is coordinated to the Eu(III) ion, and a coordination structure having a coordination number of 8 is formed by the Eu(III) ion.

[Chemical Formula 8]

(4)
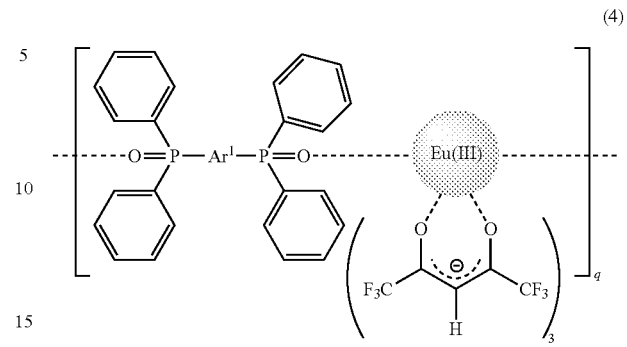

The rare-earth complex polymer of the present embodiment can be synthesized, for example, by a method of stirring a rare-earth metal compound as a raw material of a rare-earth ion and a compound to be a ligand under the presence of a catalyst as necessary in a solvent capable of dissolving or dispersing these materials (a liquid-liquid diffusion method). The solvent may be used by mixing solvents suitable for the rare-earth metal compound and the compound to be a ligand respectively, and, for example, a mixed solvent of dichloromethane/methanol can be applied. As the catalyst, trimethylamine or lithium hydroxide, for example, can be added as necessary.

The rare-earth complex polymer of the present embodiment has properties as a fluorescent material, further has a favorable dispersibility to a plastic material because of containing an organic ligand, and furthermore, has an excellent heat resistance. Therefore, the rare-earth complex polymer can be applied as a fluorescent material that can be blended in a plastic material and then fabricated.

The plastic material in which the rare-earth complex polymer is blended is not particularly limited, and various materials can be applied. Examples of the plastic material include polyethylene resins, polypropylene resins, polyvinyl chloride resins, urea resins, fluororesins, polyester resins, polyamide resins, polyacetal resins, polycarbonate resins, polyarylate resins, polysulfone resins, polyphenylene sulfide resins, polyethersulfone resins, polyarylsulfone resins, polytetrafluoroethylene resins, phenol resins, unsaturated polyester resins, epoxy resins, polyimide resins, and polyamide-imide resins.

A method for blending and fabricating the rare-earth complex polymer is not particularly limited, and includes injection molding, blow molding, compression molding, extrusion, reaction molding, hollow molding, thermoforming, and FRP molding. For these molding methods, a high temperature, about 300° C. especially in the case where polycarbonate resins are used, is needed. On the other hand, the rare-earth complex polymer of the present embodiment can stably exist even at a high temperature exceeding 300° C. and maintain a high emission intensity by appropriately selecting the structure of a ligand or the like, and therefore makes it possible to be blended in the plastic material described above and fabricated.

And the rare-earth complex polymer of the present embodiment comprises at least a structure in which rare-earth ions are crosslinked by phosphine oxide multidentate ligands, and therefore has a narrow full width at half maximum when an optical spectrum is taken, and can exhibit beautiful luminescent color in addition to a high heat resistance and a high emission intensity, and besides, can exhibit an excellent effect in terms of quantum irradiation efficiency or fluorescence lifetime.

EXAMPLES

Experimental Example A

Synthesis of Rare-Earth Complex Polymer

First, tris(hexafluoroacetylacetonato)europium(III) was synthesized by mixing europium acetate as a raw material of a Eu(III) ion and 1,1,1,5,5-hexafluoro-2,4-pentanedione as a raw material of a ligand represented by the above formula (2).

Next, a methanol solution containing the tris(hexafluoroacetylacetonato)europium(III) and a compound to be a raw material of a phosphine oxide bidentate ligand was prepared, and the solution was stirred for 12 hours under reflux. After that, the obtained reaction mixture was concentrated with a rotary evaporator, and furthermore, purified by carrying out recrystallization by using methanol to obtain the target rare-earth complex polymer. In the present example, three rare-earth complex polymers, a rare-earth complex polymer in which $Ar^1$ in the above formula (4) is a group (m=0) represented by the above formula (3a) ($[Eu(hfa)_3(dpb)]_n$, Example 1), a rare-earth complex polymer in which $Ar^1$ in the above formula (4) is a group (m=0) represented by the above formula (3b) ($[Eu(hfa)_3(dpbp)]_n$, Example 2), and a rare-earth complex polymer in which $Ar^1$ in the above formula (4) is a group (m=0) represented by the above formula (3c) ($[Eu(hfa)_3(dpbt)]_n$, Example 3) were synthesized.

Moreover, as a comparative example, a methanol solution containing tris(hexafluoroacetylacetonato)europium (III) and 1,1'-biphenyl-2,2'-diylbis(diphenylphosphine oxide) (BIPHEPO) was prepared, and the solution was stirred for 12 hours under reflux. After that, the obtained reaction mixture was concentrated with a rotary evaporator, and furthermore purified by carrying out recrystallization by using methanol to synthesize a rare-earth complex in which a crosslinked structure is not formed by a phosphine oxide bidentate ligand (a compound represented by the following formula (5), Eu(hfa)$_3$(BIPHEPO), Comparative Example 1).

[Chemical Formula 9]

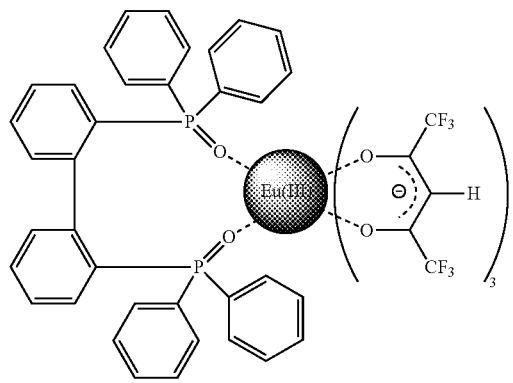

(5)

(Evaluation of Properties)

First, it was found as a result of an X-ray structure analysis of the rare-earth complex polymers of Examples 1 to 3 and the rare-earth complex of Comparative Example 1 that two molecules (Examples 1 to 3) or one molecule (Comparative Example 1) of phosphine oxide bidentate ligands were coordinated to one Eu(III) ion at two sites and that three molecules of hexafluoroacetylacetonate (Hfa) were coordinated thereto at six sites and an octa-coordinated complex structure was formed.

Moreover, as an example, an emission spectrum of a solid state of the rare-earth complex polymer of Example 1, [Eu (hfa)$_3$(dpb)]$_n$ excited at 380 nm (ligand excitation) is shown in FIG. 1. As shown in FIG. 1, emissions at 578 nm, 592 nm, 613 nm, and 649 nm based on f-f electronic transition of Eu (III) were observed in the rare-earth complex polymer.

Figure 2:
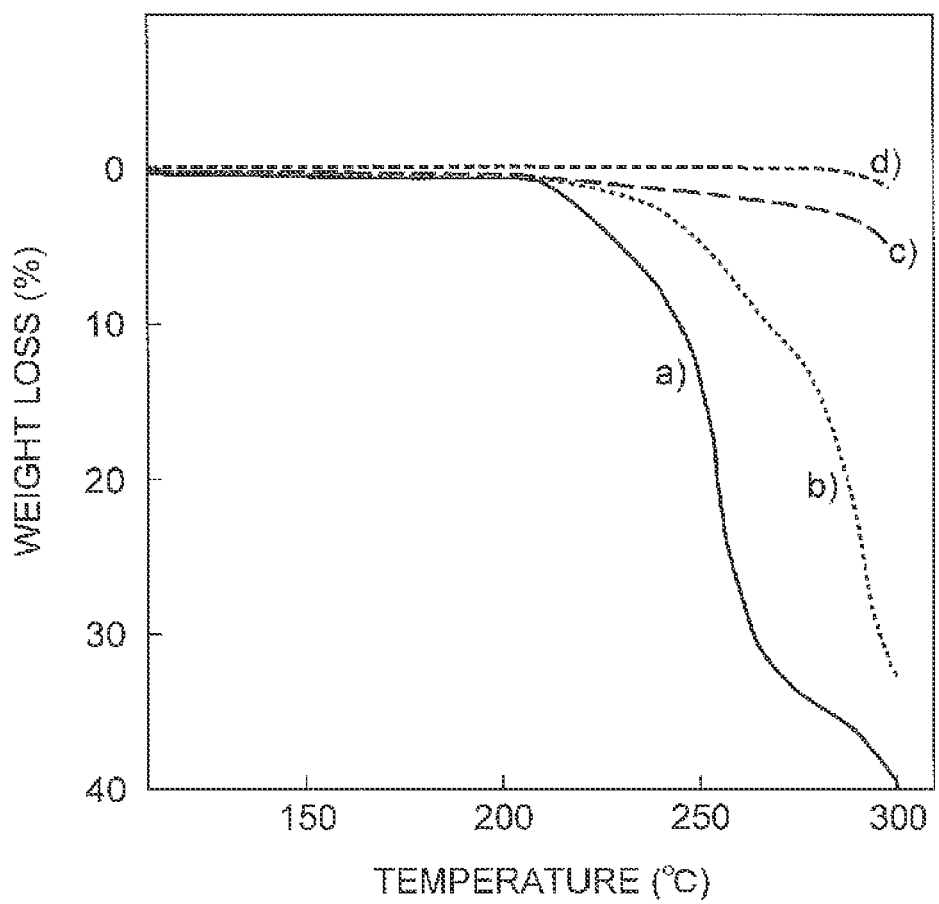
FIG. 2 is a graph showing the results of a thermogravimetric analysis by TG-DTA of rare-earth complex polymers of Examples 1 to 3 and a rare-earth complex of Comparative Example 1.

Furthermore, a thermogravimetric analysis by TG-DTA was carried out for the rare-earth complex polymers of Example 1 to 3 and the rare-earth complex of Comparative Example 1. The obtained results are shown in FIG. 2. In FIG. 2, (a) shows the result of [Eu(hfa)$_3$(BIPHEPO)]$_n$ (Comparative Example 1), (b) shows the result of [Eu(hfa)$_3$(dpb)]$_n$ (Example 1), (c) shows the result of [Eu(hfa)$_3$(dpbp)]$_n$ (Example 2), (d) shows the result of [Eu(hfa)$_3$(dpbt)]$_n$ (Example 3).

From these results, thermal decomposition temperatures of the rare-earth complex polymers or the rare-earth complex of respective Examples and Comparative Example were calculated as follows.

[Eu(hfa)$_3$(dpb)]$_n$ (Example 1): 230° C.
[Eu(hfa)$_3$(dpbp)]$_n$ (Example 2): 290° C.
[Eu(hfa)$_3$(dpbt)]$_n$ (Example 3): 310° C.
[Eu(hfa)$_3$(BIPHEPO)]$_n$ (Comparative Example 1): 210° C.

As described above, it turned out that the rare-earth complex polymers of Examples 1 to 3 had a higher thermal decomposition temperature compared with the rare-earth complex of Comparative Example 1 and had an excellent heat resistance.

Experimental Example B

According to the following method, raw materials of various ligands were synthesized, and furthermore, various rare-earth complex polymers were synthesized by using the raw materials. In addition, the following various analyses were carried out under the following conditions. An IR measurement was carried out by using FT/IR-350 manufactured by Nippon Kogaku. A $^1$H-NMR measurement was carried out by using JNM-EX270 (270 MHz) manufactured by JEOL Ltd., and a chemical shift was determined by using tetramethylsilane (TMS) as an internal standard. Element and mass analyses were carried out in Instrumental Analysis Division of Hokkaido University. A thermogravimetric analysis was carried out by using TermoEvo TG8120 manufactured by Rigaku Corporation in an argon atmosphere at a temperature raising rate of 1° C./min. A DSC measurement was carried out by using DSC 3220 manufactured by MAC Science Co. at a temperature raising rate of 2° C./min.

Synthesis of Raw Material of Ligand

Synthesis of 1,4-Bis(diphenylphosphoryl)benzene (dpb)

A 100 mL of three-necked flask was flame-dried, and the inside of the flask was replaced with Ar. To this three necked flask, 0.80 mL (8.0 mmol) of 1,4-difluorobenzene was placed, and furthermore a 40 mL potassium diphenyl phosphide solution (0.5 M THF solution, 20 mmol) was slowly added with a syringe, and the resultant mixture was stirred at room temperature for 1 hour, and then refluxed for 12 hours. At that time, the color of the solution was changed from reddish-brown to dull yellow. After the reflux, the reaction was stopped, THF was distilled off under reduced pressure, and furthermore, methanol (about 40 mL) was added. After heating the solution and refluxing for 30 minutes, methanol was decanted to obtain a gray powder.

Next, the above obtained gray powder and about 20 mL of dichloromethane were placed in a flask, the solution was cooled to 0° C., and 30% hydrogen peroxide water (about 5 mL) was added to the solution. The mixture was stirred for 2 hours. After the reaction, the product was extracted with dichloromethane, washed three times with a saturated saline solution, and dried with anhydrous magnesium sulfate, and furthermore, the solvent was distilled off with a evaporator. The concentrate was recrystallized with dichloromethane to obtain a white crystal of 1,4-bis(diphenylphosphoryl)benzene (dpb) (yield: 2.5 g (66%)). The analysis results of the product were as follows.

IR (KBr): 1121 (st, P=O) cm$^{-1}$.
$^1$H-NMR (270 MHz, CDCl$_3$, 25° C.) δ 7.48-7.78 (m, 24H; P—C$_6$H$_5$, C$_6$H$_4$) ppm.
ESI-Mass (m/z)=479.1 [M+H]$^+$.
Anal.: (Calcd. For C$_{30}$H$_{24}$O$_2$P$_2$): C, 75.31; H, 5.06%. (Found): C, 74.86; H, 5.11%.

Synthesis of 1,4-Bis(diphenylphosphoryl)biphenyl (dpbp)

A 100 mL of three-necked flask was flame-dried, and the inside of the flask was replaced with Ar. To this three necked flask, 1.9 g (6.0 mmol) of 4,4'-dibromobiphenyl and 30 mL of THF were placed, and the resultant mixture was cooled to −80° C. with liquid nitrogen/ethanol. To this solution, 9.3 mL (15 mmol) of a 1.6 M n-butyllithiumhexane solution was slowly added with a syringe. This addition was carried out over about 15 minutes, during this time, a yellow precipitate was produced. The solution was stirred at −10° C. for 3 hours. Next, the solution was again cooled to −80° C., and then 2.7 mL (15 mmol) of dichlorophenylphosphide was added dropwise, and the solution was gradually brought back to room temperature while stirred for 14 hours. After that, the reaction was stopped, and the product was extracted with ethyl acetate. The obtained solution was washed three times with a saturated saline solution, dried with anhydrous magnesium sulfate, and the solvent was distilled off with an evaporator. The obtained crude product was purified by washing multiple times with acetone and ethanol to obtain a white powder.

Next, the above obtained white powder and about 40 mL of dichloromethane were placed in a flask, the solution was cooled to 0° C., and 30% hydrogen peroxide water (about 5 mL) was added to the solution. The mixture was stirred for 2 hours. After the product was extracted with dichloromethane, the extracted liquid was washed three times with a saturated saline solution, and dried with anhydrous magnesium sulfate. After that, the solvent was distilled off with an evaporator to obtain a white powder. The white powder was recrystallized with dichloromethane to obtain a white crystal of 1,4-bis (diphenylphosphoryl)biphenyl (dpbp) (yield: 1.1 g (33%)). The analysis results of the product were as follows.

IR (KBr): 1120 (st, P=O) cm$^{-1}$.
$^1$H-NMR (270 MHz, CDCl$_3$, 25° C.) δ 7.67-7.80 (m, 16H; P—C$_6$H$_5$, C$_6$H$_4$), 7.45-7.60 (m, 12H; P—C$_6$H$_5$, C$_6$H$_4$) ppm.
ESI-Mass (m/z)=555.2 [M+H]$^+$.
Anal.: (Calcd. For C$_{36}$H$_{28}$O$_2$P$_2$): C, 77.97; H, 5.09%. (Found): C, 77.49; H, 5.20%.

Synthesis of 4,4-Bis(diphenylphosphoryl)bithiophene (dpbt)

A 100 mL of three-necked flask was flame-dried, and the inside of the flask was replaced with Ar. To this three necked flask, 1.2 g (7.2 mmol) of bithiophene and 20 mL of THF were placed, and the resultant mixture was cooled to −80° C. with liquid nitrogen/ethanol. To this solution, 13 mL (20 mmol) of a 1.6 M n-butyllithiumhexane solution was slowly added with a syringe. This addition was carried out over about 15 minutes, during this time, a yellow precipitate was produced. The solution was stirred at −10° C. for 3 hours, and then 3.7 mL (20 mmol) of chlorodiphenylphosphide was added dropwise to this solution at −80° C. And the solution was gradually brought back to room temperature while stirred for 18 hours. After the product was extracted with ethyl acetate, the extract was washed three times with a saturated saline solution, dried with anhydrous magnesium sulfate, and the solvent was distilled off with an evaporator. The obtained crude product was purified by washing repeatedly with methanol to obtain a yellow powder.

Next, the above obtained yellow powder and about 40 mL of dichloromethane were placed in a flask, the solution was cooled to 0° C., and 30% hydrogen peroxide water (10 mL) was added to the solution. The mixture was stirred for 2 hours. After the product was extracted with dichloromethane, the extracted liquid was washed three times with a saturated saline solution, and dried with anhydrous magnesium sulfate. After that, the solvent was distilled off with an evaporator to obtain a yellow powder. The yellow powder was recrystallized with dichloromethane to obtain a yellow crystal of 4,4-bis(diphenylphosphoryl)bithiophene (dpbt) (yield: 1.4 g (31%)). The analysis results of the product were as follows.

IR (KBr): 1122 (st, P=O)
$^1$H-NMR (270 MHz, CDCl$_3$, 25° C.) δ 7.45-7.79 (m, 20H; P—C$_6$H$_5$), 7.33-7.37 (m, 2H; C$_4$H$_2$S), 7.24-7.27 (m, 2H; C$_4$H$_2$S) ppm.
ESI-Mass (m/z)=567.1 [M+H]$^+$.
Anal.: (Calcd. For C$_{32}$H$_{24}$O$_2$P$_2$S$_2$): C, 67.83; H, 4.27%. (Found): C, 67.13; H, 4.40%.

Synthesis of 3,6-Bis(diphenylphosphoryl)-9-phenylcarbazole (dppcz)

A 100 mL of three-necked flask was flame-dried, and the inside of the flask was replaced with Ar. To this three necked flask, 2.4 g (6.0 mmol) of 3,6-dibromo-9-phenylcarbazole and 30 mL of THF were placed, and the resultant mixture was cooled to −80° C. with liquid nitrogen/ethanol. To this solution, 8.8 mL (14 mmol) of a 1.6 M n-butyllithiumhexane solution was slowly added with a syringe. This addition was carried out over about 10 minutes, during this time, a yellowish-white precipitate was produced. The solution was stirred at −10° C. for 2 hours, and then 2.6 mL (14 mmol) of dichlorophenylphosphide was added dropwise to this solution at −80° C. And the solution was gradually brought back to room temperature and stirred for 18 hours to obtain a white precipitate. The white precipitate was filtrated, washed several times with methanol, and then dried under vacuum.

Next, the above obtained white powder and about 40 mL of dichloromethane were placed in a flask, the solution was cooled to 0° C., and 30% hydrogen peroxide water (8 mL) was added to the solution. The mixture was stirred for 2 hours. After the product was extracted with dichloromethane, the extracted liquid was washed three times with a saturated saline solution, and dried with anhydrous magnesium sulfate.

After that, the solvent was distilled off with an evaporator to obtain a white powder. The white powder was recrystallized with dichloromethane/hexane to obtain a colorless crystal of 3,6-bis(diphenylphosphoryl)-9-phenylcarbazole (dppcz) (yield: 2.0 g (53%)). The analysis results of the product were as follows.

IR (KBr): 1122 (st, P=O) cm$^{-1}$.

$^1$H-NMR (270 MHz, CDCl$_3$, 25° C.) δ 8.43-8.47 (d, J=10.8 Hz, 2H; P—C$_6$H$_5$), 7.63-7.76 (m, 11H; C$_4$H$_2$S), 7.43-7.60 (m, 18H; C$_4$H$_2$S) ppm.

ESI-Mass (m/z)=644.2 [M+H]$^+$.

Anal.: (Calcd. For C$_{43}$H$_{31}$NO$_2$P$_2$): C, 78.37; H, 4.85; N, 2.18%. (Found): C, 78.42; H, 5.00; N, 2.18%.

Synthesis of Rare-Earth Complex Polymer;
Examples 4 to 8

In chloroform (20 mL), 1 equivalent of the raw material of a ligand obtained as described above and 1 equivalent of [Eu(hfa)$_3$(H$_2$O)$_2$] were dissolved. The solution was refluxed for 8 hours under stirring. After that, the obtained reaction mixture was concentrated and dried. And a rare-earth complex polymer was obtained by a liquid-liquid diffusion method of methanol/chloroform solution.

In the present examples, by using above described dpb, dpbp, dpbt, and dppcz respectively as a raw material of a ligand, four rare-earth complex polymers, a rare-earth complex polymer in which Ar$^1$ in the above formula (4) is a group (m=0) represented by the above formula (3a) ([Eu(hfa)$_3$(dpb)]$_n$, Example 4), a rare-earth complex polymer in which Ar$^1$ in the above formula (4) is a group (m=0) represented by the above formula (3b) ([Eu(hfa)$_3$(dpbp)]$_n$, Example 5), a rare-earth complex polymer in which Ar$^1$ in the above formula (4) is a group (m=0) represented by the above formula (3c) ([Eu(hfa)$_3$(dpbt)]$_n$, Example 6), and a rare-earth complex polymer in which Ar$^1$ in the above formula (4) is a group (m=0) represented by the above formula (3d) ([Eu(hfa)$_3$(dppcz)]$_n$, Example 7) were synthesized.

The yield and analysis results of the obtained respective rare-earth complex polymers are as follows.

[Eu(hfa)$_3$(dpb)]$_n$
Yield: 60 mg (42%, in terms of monomers)
IR (KBr): 1652 (st, C=O), 1256-1145 (st, C—F), 1128 (st, P=O) cm$^{-1}$
ESI-Mass (m/z)=1045.05 [Eu(hfa)$_2$(dpb)]$^+$, 2297.18 [Eu$_2$(hfa)$_5$(dpb)$_2$]$^+$.
Anal.: (Calcd. For [C$_{45}$H$_{27}$EuF$_{18}$O$_8$P$_2$]$_n$), C, 43.18; H, 2.17%. (Found), C, 43.12; H, 2.28%.

[Eu(hfa)$_3$(dpbp)]$_n$
Yield: 98 mg (67%, in terms of monomers)
IR (KBr): 1653 (st, C=O), 1255-1145 (st, C—F), 1127 (st, P=O) cm$^{-1}$
ESI-Mass (m/z)=1120.08 [Eu(hfa)$_2$(dpbp)]$^+$, 2447.15 [Eu$_2$(hfa)$_5$(dpbp)$_2$]$^+$.
Anal.: (Calcd. For [C$_{51}$H$_{31}$EuF$_{18}$O$_8$P$_2$]$_n$), C, 46.14; H, 2.35%. (Found), C, 45.59; H, 2.49%.

[Eu(hfa)$_3$(dpbt)]$_n$
Yield: 160 mg (68%, in terms of monomers)
IR (KBr): 1651 (st, C=O), 1254-1145 (st, C—F), 1128 (st, P=O) cm$^{-1}$
ESI-Mass (m/z)=1133.00 [Eu(hfa)$_2$(dpbt)]$^+$, 2473.02 [Eu$_2$(hfa)$_5$(dpbt)$_2$]$^+$.
Anal.: (Calcd. For [C$_{47}$H$_{27}$EuF$_{18}$O$_8$P$_2$S$_2$]$_n$), C, 42.14; H, 2.03%. (Found), C, 42.67; H, 2.12%.

[Eu(hfa)$_3$(dppcz)]$_n$
Yield: 110 mg (50%, in terms of monomers)
IR (KBr): 1652 (st, C=O), 1256-1145 (st, C—F), 1128 (st, P=O) cm$^{-1}$
ESI-Mass (m/z)=1210.13 [Eu(hfa)$_2$(dppcz)]$^+$, 1853.34 [Eu(hfa)$_2$(dppcz)$_2$]$^+$.
Anal.: (Calcd. For [C$_{57}$H$_{34}$EuF$_{18}$NO$_8$P$_2$]$_n$), C, 48.32; H, 2.42; N, 0.99%. (Found), C, 48.32; H, 2.42; N, 1.06%.

Moreover, as a comparative example, [Eu(hfa)$_3$(BIPHEPO)] (Comparative Example 2) was synthesized in the same manner as in Comparative Example 1 described above and a rare-earth complex represented by [Eu(hfa)$_3$(H$_2$O)$_2$] (Comparative Example 3) which does not contain a phosphine oxide ligand was synthesized.

In addition, as a result of X-ray structure analysis, it was confirmed that each rare-earth complex polymer of Examples 4 to 7 also had an octa-coordinated complex structure similar to the rare-earth complex polymers of Examples 1 to 3.

(Evaluation of Properties)

Figure 3:
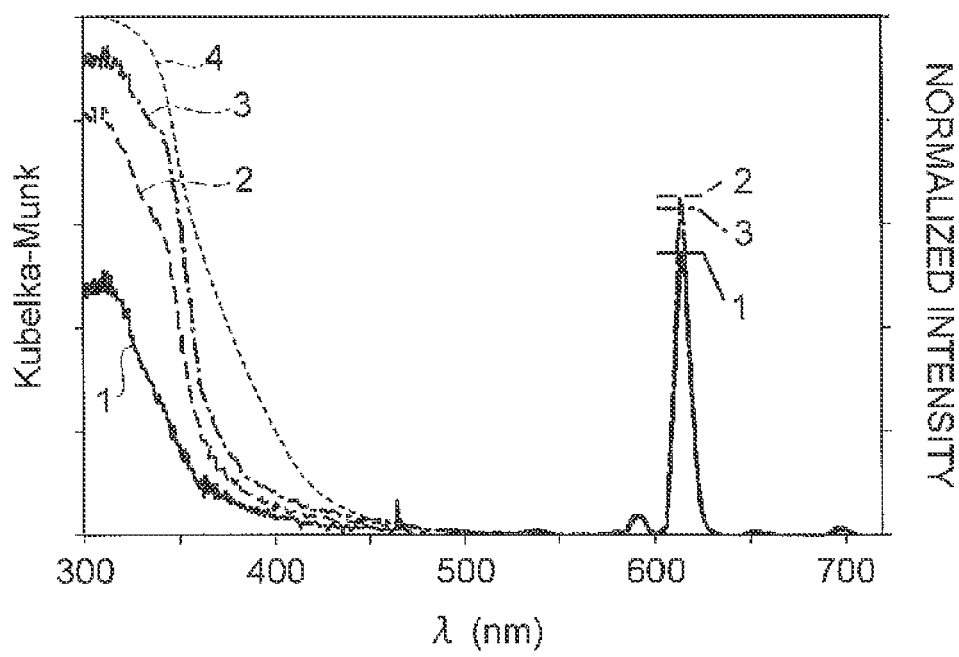
FIG. 3 is a chart showing diffuse reflectance absorption spectra of a solid state of rare-earth complex polymers of Examples 4, 5 and 7 and a rare-earth complex of Comparative Example 2, and emission spectra of a solid state of rare-earth complex polymers of Example 1, 2, and 4 excited at 465 nm (ligand excitation).

Of the rare-earth complex polymers described above, diffuse reflectance absorption spectra of a solid state of the rare-earth complex polymers of Examples 4, 5, and 7, and the rare-earth complex of Comparative Example 3 are shown on the left side in FIG. 3, and emission spectra of a solid state of the rare-earth complex polymers of Example 4, 5, and 7 excited at 465 nm (ligand excitation) are shown on the right side in FIG. 3. As shown on the left side in FIG. 3, in the rare-earth complex polymers of Examples 4, 5, and 7, and a rare-earth complex of Comparative Example 3, an absorption at 310 nm based on π-π* transition by an hfa ligand was confirmed, and in the rare-earth complex polymers of Examples 4, 5, and 7, a weak absorption at 465 nm based on $^7F_0$-$^5D_2$ transition of Eu(III) was observed. Moreover, as shown on the right side in FIG. 3, in the rare-earth complex polymers of Examples 4, 5, and 7, emissions at 578 nm, 591 nm, 613 nm, 649 nm, and 698 nm based on f-f electronic transition of Eu(III) were observed.

Furthermore, the following evaluation was carried out for the rare-earth complex polymers of Examples 4, 5, and 7, and the rare-earth complexes of Comparative Examples 2 and 3. The obtained results are shown together in Table 1.

First, a thermogravimetric measurement by TGA was carried out for the rare-earth complex polymers of Examples 4, 5, and 7 and the rare-earth complexes of Comparative Example 2, and their thermal decomposition temperatures (° C.) were measured.

Moreover, emission of each rare-earth complex polymer or rare-earth complex was measured by using a third harmonic wave (355 nm) of a Nd:YAG laser (INIDI-50 manufactured by Spectra-Physics KK., full width at half maximum=5 ns, center wavelength=1064 nm) as an excitation light source and a photomultiplier tube (R5108 manufactured by Hamamatsu Photonix K.K., response time ≤1.1 ns). And a response of the Nd:YAG laser was monitored by an oscilloscope (TDS3052 manufactured by Sony/Tektronics Corporation, 500 MHz) and an emission lifetime (t$_{obs}$, units: ms) of each rare-earth complex polymer or rare-earth complex was calculated from the slope of a logarithmic plot of the decay profile.

Moreover, the total emission quantum yield (F$_{tot}$, units: %) of each rare-earth complex polymer or rare-earth complex excited at 380 nm was measured with a fluorophotometer (F-6300-H manufactured by JASCO Corporation) connected to an integrating sphere unit (ILF-533 manufactured by JASCO Corporation, φ=100 mm).

Furthermore, radiation lifetime (τ$_{rad}$, units: ms), 4f-4f emission quantum yield (F$_{Ln}$, units: %), photosensitization energy transfer efficiency (η$_{sens}$, units: %), radiation rate constant (k$_r$, units: S$^{-1}$), and nonradiation rate constant (k$_{nr}$, units: S$^{-1}$) of each rare-earth complex polymer or rare-earth complex were determined. These satisfy the relation represented by the following formulas respectively.

$$\tau_{rad}=1/k_r \quad (a)$$

$$t_{obs}=1/(k_r+k_{nr}) \quad (b)$$

$$F_{Ln}=k_r/(k_r+k_{nr}) \quad (c)$$

$$1/\tau_{rad}=A_{MD,0}n^3(l_{tot}/l_{MD}) \quad (d)$$

$$k_{nr}=1/t_{obs}-1/\tau_{rad} \quad (e)$$

In these formulas, $A_{MD,0}$ represents the spontaneous emission probability of $^5D_0$-$^7F_1$ transition in vacuum (here, 14.65 s$^{-1}$), n represents the refractive index of the solvent (here, 1.5 is used), and ($l_{tot}/l_{MD}$) represents a ratio of the whole range of emission spectrum by Eu(III) to the range of $^5D_0$-$^7F_1$ emission.

In addition, the values of thermal decomposition temperature, $t_{obs}$, $\tau_{rad}$, $F_{Ln}$, $F_{tot}$, and $\eta_{sens}$ of the rare-earth complex of Comparative Example 3 in Table 1 are all literature data (Y. Hasegawa et al., J. Phys. Chem., A2003, 107, 1697-1702).

TABLE 1

| Rare-earth complex polymer or rare-earth complex | | Thermal decomposition temperature (° C.) | $t_{obs}$ (ms) | $\tau_{red}$ (ms) | $F_{Ln}$ (%) | $F_{tot}$ (%) | $\eta_{sens}$ (%) | $k_r$ (S$^{-1}$) | $k_{nr}$ (S$^{-1}$) |
|---|---|---|---|---|---|---|---|---|---|
| Example 4 | [Eu(hfa)$_3$(dpb)]$_n$ | 261 | 0.93 ± 0.016 | 1.3 | 70 | 31 | 44 | 7.5 × 10$^2$ | 3.3 × 10$^2$ |
| Example 5 | [Eu(hfa)$_3$(dpbp)]$_n$ | 308 | 0.85 ± 0.014 | 1.2 | 72 | 29 | 40 | 8.5 × 10$^2$ | 3.2 × 10$^2$ |
| Example 7 | [Eu(hfa)$_3$(dppcz)]$_n$ | 300 | 0.93 ± 0.020 | 1.1 | 83 | 53 | 64 | 8.9 × 10$^2$ | 1.8 × 10$^2$ |
| Comparative Example 2 | [Eu(hfa)$_3$(BIPHEPO)] | 230 | 0.94 ± 0.004 | 1.3 | 73 | 21 | 29 | 7.8 × 10$^2$ | 2.8 × 10$^2$ |
| Comparative Example 3 | [Eu(hfa)$_3$(H$_2$O)$_2$] | 220 | 0.22 | 1.1 | 19 | 2.6 | 13 | 8.8 × 10$^2$ | 3.7 × 10$^2$ |

As shown in Table 1, it turned out that the rare-earth complex polymers of Examples 4, 5, and 7 had not only excellent fluorescence properties but also had a higher heat resistance compared with the rare-earth complexes of Comparative Examples 2 and 3.

Experimental Example C

Synthesis of Rare-Earth Complex Polymer

In a mixed solvent obtained by mixing 10 mL of methanol and 5 mL of chloroform, 0.18 mmol of Tb(hfa)$_3$(H$_2$O)$_3$ and 0.18 mmol of a compound to be a raw material of a phosphine oxide bidentate ligand were dissolved, and heating under reflux was carried out at 80° C. for 8 hours. After that, a white precipitate in the reaction liquid was separated and washed several times with methanol and chloroform to obtain the target rare-earth complex polymer. In the present example, two rare-earth complex polymers, [Tb(hfa)$_3$(dpb)]$_n$ (Example 8) and [Tb(hfa)$_3$(dpbp)]$_n$ (Example 9), were synthesized as a rare-earth complex polymer in which Eu in the rare-earth complex polymers in Examples 1 and 2 is replaced by Tb.

The yield and analysis results of the rare-earth complex polymers of Examples 8 and 9 were as follows.

[Tb(hfa)$_3$(dpb)]$_n$ (Example 8)
Yield: 90 mg (34%)
IR (KBr): 1655 (st, C=O), 1256-1141 (st, C—F), 1125 (st, P=O) cm$^{-1}$
Anal.: (Calcd. For [C$_{45}$H$_{27}$F$_{18}$O$_8$P$_2$Tb]$_n$), C, 42.95; 2.34%. (Found), C, 42.87; H, 2.29%.

[Tb(hfa)$_3$(dpbp)]$_n$ (Example 9)
Yield: 95 mg (40%)
IR (KBr): 1653 (st, C=O), 1253-1142 (st, C—F), 1125 (st, P=O) cm$^{-1}$
Anal.: (Calcd. For [C$_{51}$H$_{31}$F$_{18}$O$_8$P$_2$Tb]$_n$), C, 45.90; 2.34%. (Found), C, 45.76; H, 2.48%.

(Evaluation of Properties)

Figure 4:
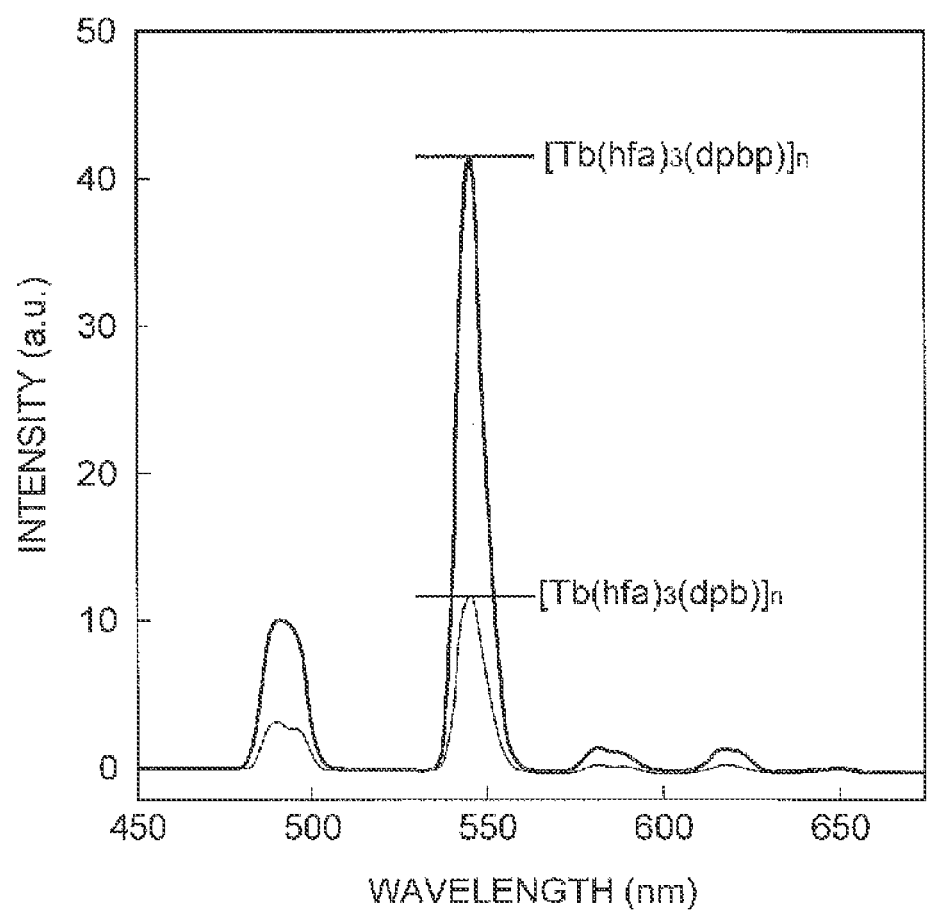
FIG. 4 is a chart showing emission spectra of a solid state of rare-earth complex polymers, $[Tb(hfa)_3(dpb)]_n$ and $[Tb(hfa)_3(dpbp)]_n$, of Examples 8 and 9 excited at 360 nm (ligand excitation).

Emission spectra of a solid state of [Tb(hfa)$_3$(dpb)]$_n$ and [Tb(hfa)$_3$(dpbp)]$_n$ as rare-earth complex polymers of Examples 8 and 9 excited at 360 nm (ligand excitation) were measured with an F-6300-H manufactured by JASCO Corporation. The obtained results are shown in FIG. 4.

The invention claimed is:

1. A rare-earth complex polymer comprising:
a plurality of both trivalent rare-earth ions and phosphine oxide multidentate ligands; and
a crosslinked structure formed by the phosphine oxide multidentate ligands being coordinated to a plurality of the rare-earth ions,
wherein the phosphine oxide multidentate ligand is a phosphine oxide bidentate ligand comprising a structure represented by the following formula (1):

$$O=P(Ar^{12})(Ar^{14})-(R^{11})_n-P(Ar^{13})(Ar^{15})=O \quad (1)$$

wherein the R$^{11}$ is a divalent organic group, Ar$^{12}$, Ar$^{13}$, Ar$^{14}$, and Ar$^{15}$ each independently represent a monovalent aromatic group which may have a substituent; Ar$^{12}$ and Ar$^{13}$, and Ar$^{14}$ and Ar$^{15}$ may be directly bonded with each other or may be bonded through a linking group; and n is an integer of 1 to 20, and the R$^{11}$ is a group represented by the following formula (3a), a group represented by the following formula (3b), a group represented by the following formula (3c), or a group represented by the following formula (3d):

(3a)

$(R^2)_m$ (on phenylene ring)

-continued (3b)

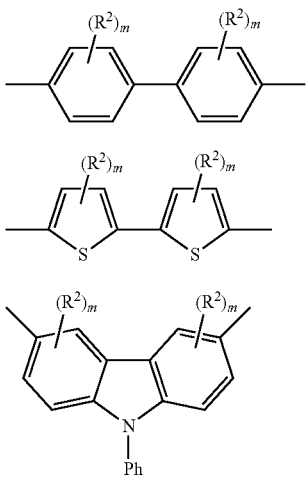

(3c)

(3d)

wherein R² represents a monovalent organic group, m is an integer of 0 to a number of sites capable of being substituted in a ring which R² is bonded with, and Ph represents a phenyl group; and in the case where m is 2 or more, a plurality of R² may be each the same or different from each other, and wherein the rare-earth ion is a Eu(III) ion, a Tb(III) ion, a Sm(III) ion, an Yb(III) ion, a Nd(III) ion, or an Er(III) ion.

2. The rare-earth complex polymer according to claim 1, wherein a ligand represented by the following formula (2) is further coordinated to the rare-earth ion:

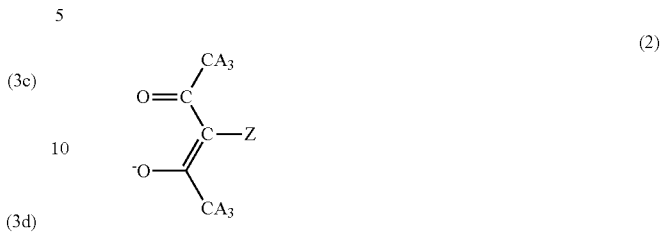

(2)

wherein A represents a hydrogen atom or a halogen atom, and Z represents a hydrogen atom or a deuterium atom.

3. The rare-earth complex polymer according to claim 2, wherein one of the rare-earth ions forms a coordination structure having a coordination number of 8 or more by a plurality of the phosphine oxide multidentate ligands each being coordinated to the rare-earth ion at one site and a plurality of ligands represented by the above formula (2), the ligands each being coordinated to the rare-earth ion at two sites.

4. A plastic molded product comprising:

a plastic material; and the rare-earth complex polymer according to claim 1 dispersed in the plastic material.

* * * * *